United States Patent [19]
Linder

[11] Patent Number: 5,175,950
[45] Date of Patent: Jan. 5, 1993

[54] ELECTROMAGNETIC FIELD GENERATING FISHING LURE

[76] Inventor: Wyck R. Linder, 7550 Great Plaines Blvd., Chanhassen, Minn. 55317

[21] Appl. No.: 865,925

[22] Filed: Apr. 9, 1992

[51] Int. Cl.⁵ .............................................. A01K 79/02
[52] U.S. Cl. ....................................................... 43/17.1
[58] Field of Search ........................................... 43/17.1

[56] References Cited
U.S. PATENT DOCUMENTS

| | | |
|---|---|---|
| 2,112,901 | 4/1938 | Anderson . |
| 2,152,275 | 3/1939 | Parkins . |
| 2,757,475 | 8/1956 | Pankove . |
| 2,766,544 | 10/1956 | Silverthorne . |
| 2,784,399 | 3/1957 | Smith . |
| 2,829,462 | 4/1958 | Stokes . |
| 2,932,110 | 4/1960 | Kilpinen et al. . |
| 3,083,491 | 4/1963 | Meysan et al. . |
| 3,310,902 | 3/1967 | Godby . |
| 3,363,354 | 1/1968 | Riemer . |
| 3,363,356 | 1/1968 | Kreutzer . |
| 3,416,254 | 12/1968 | Bornzin . |
| 3,535,814 | 10/1970 | O'Brien . |
| 4,163,337 | 8/1979 | Kress . |
| 4,625,447 | 12/1986 | Buchanan . |
| 4,627,187 | 12/1986 | Williams . |
| 4,782,617 | 11/1988 | Peikin . |
| 4,787,167 | 11/1988 | Wroclawski . |
| 4,805,339 | 2/1989 | Fuentes et al. . |
| 4,825,810 | 5/1989 | Sharber . |
| 4,864,763 | 9/1989 | Peikin . |
| 4,896,452 | 1/1990 | Smith et al. . |
| 4,960,437 | 10/1990 | Watson et al. . |
| 4,970,808 | 11/1990 | Massie . |

OTHER PUBLICATIONS

Electric Fishing "Night Bobby" of Rieadco Corp.

Primary Examiner—Kurt C. Rowan
Attorney, Agent, or Firm—Palmatier, Sjoquist and Helget

[57] ABSTRACT

A fishing lure which generates an electromagnetic field about the body of the fishing lure to closely resemble the electromagnetic field naturally emitted by a fish. The fishing lure further includes a battery to generate the electromagnetic field in light or dark waters, a hook acting as the anode or cathode, a structure for isolating at least one of the anode or cathode leads to prevent shorts, and a ROM for varying the strength and/or frequency of the electromagnetic field in response to environmental factors such as the temperature of the water.

22 Claims, 2 Drawing Sheets

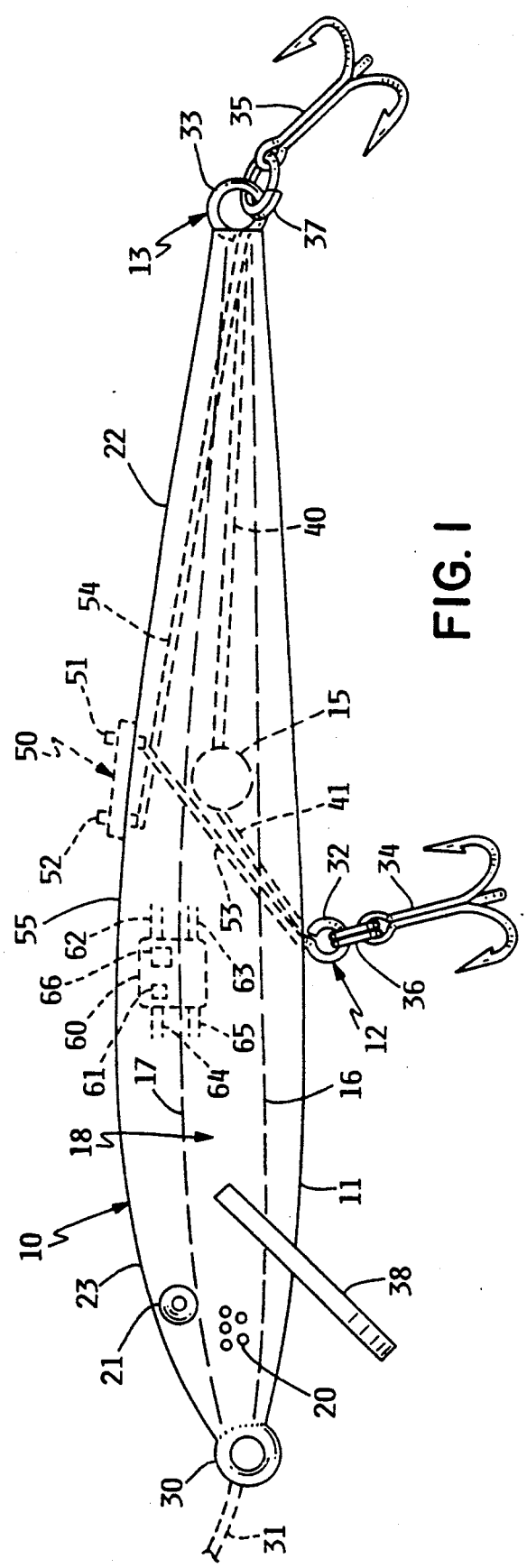
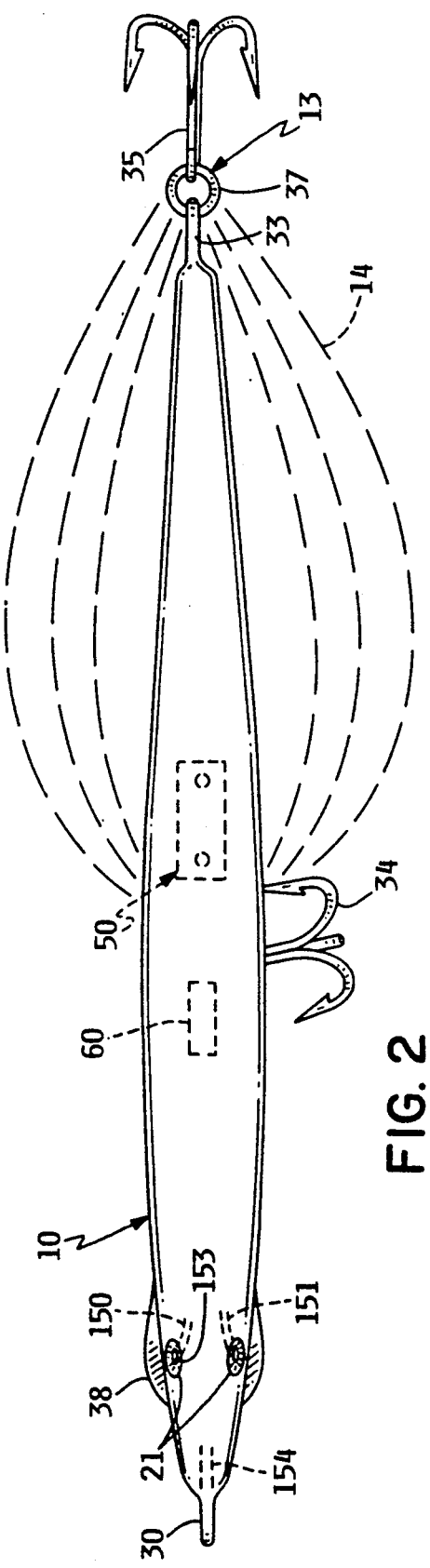
FIG. 1
FIG. 2

ELECTROMAGNETIC FIELD GENERATING FISHING LURE

BACKGROUND OF THE INVENTION

The present invention relates to a fishing lure and, more particularly, to a fishing lure which generates an electromagnetic field in a manner closely resembling the electromagnetic field naturally emitted by a fish.

A certain type of bait may attract a fish by appealing to one or more of its sensory faculties. For example, through its sense of sight, a fish may pursue a lure because of the lure's shape, color, or action. Through its sense of smell, a fish may be attracted to the freshly dug nightcrawler instead of the plastic imitation worm. Through its sense of hearing, a fish may chase the man-made acoustic lure or be chased by the sound of the pebbles thrown by the younger fisherperson. It is believed that a fish may even possess a sense of taste.

One or more of the senses of a fish may be provided by the lateral line of the fish. The lateral line of a fish is a linear series of sensory pores and tubes extending along each of the sides of a fish from head to tail. As well as providing for some of the more obvious sensory faculties, it is believed that the lateral line senses the presence of an electromagnetic field, such as that emitted by another fish. It is further believed that the electromagnetic field naturally generated by a fish is produced by and emitted from the lateral line.

SUMMARY OF THE INVENTION

A feature of the present invention is the provision in a fishing lure generating an electromagnetic field for attracting fish, of a battery in the lure body for supplying the power for the electromagnetic field such that the electromagnetic field is produced in both light and dark waters.

Another feature is the provision in a fishing lure generating an electromagnetic field for attracting fish, of variable means in the lure body for changing the strength and/or frequency of the electromagnetic field.

Another feature is the provision in a fishing lure generating an electromagnetic field for attracting fish, of isolation means adjacent one of the leads for isolating such lead from contact with objects whereby shorts between the anode and cathode leads are eliminated when the fishing lure is out of the water.

Another feature is the provision in a fishing lure generating an electromagnetic field for attracting fish, of at least one of the anode or cathode leads being electrically connected to a hook such that the hook acts as such lead.

Another feature of the present invention is the provision in a fishing lure generating an electromagnetic field for attracting fish, of the leads which generate the electromagnetic field being spaced apart and extending into the water from different portions of the lure body such that the electromagnetic field is generated about the lure body.

An advantage of the present invention is an artificial fishing lure that more closely resembles a live fish and that, accordingly, may catch a greater quantity of fish more quickly. One feature contributing to this advantage is the spacing of the anode and cathode leads to produce the electromagnetic field about the body of the fishing lure. Another feature contributing to this advantage is the provision of a ROM for regulating the electromagnetic field in response to environmental factors such as the temperature of the water.

Another advantage is that the electromagnetic field is generated in dark waters such as in the murky muddy waters of the Mississippi. Moreover, the electromagnetic field is generated at night or in the early, predawn hours when certain types of fish feed. Night fishing is especially important for the true Minnesotan whose fishing season typically begins on a certain day in May at 12:01 AM.

Another advantage is that conventional, preexisting equipment such as hooks may be used for the anode or cathode leads.

Another advantage is that the power of the electric generating means such as the battery is preserved. One feature contributing to this advantage is the isolation means adjacent one of the leads to prevent shorts between the leads. Another feature contributing to this advantage is the relatively wide spacing apart of the leads so as to minimize the electromagnetic field being generated through the atmosphere when the lure is out of the water.

Another advantage is that the present battery powered lure generates a continuous electromagnetic field of a substantially constant strength. The battery powered lure is not dependent upon the amount of light which may vary depending upon the time of day, the amount of cloud cover, the clarity of the water, the depth at which the lure is trolled, or the fluttering of electrodes.

Another advantage is that the present battery powered lure emits an electromagnetic field of a sufficient voltage to attract fish. It is preferred that the present battery lure generates a voltage above 0.1 volts. More preferably, the battery powered lure generates from 1.5 to 3.0 volts. It is believed that voltage on the order of millivolts is insufficient to attract fish.

Another advantage is that the present lure is simple and inexpensive to manufacture.

Another advantage is that the present lure is simple to operate.

Another advantage is that the present lure, especially the plastic molded lure in which the battery is sealed during the molding process, is environmentally safe. Such a sealed battery is less susceptible to leakage.

BRIEF DESCRIPTION OF THE DRAWINGS

FIG. 1 is a side elevation, partially phantom view of the present fishing lure showing both the battery and solar powered embodiments of the lure.

FIG. 2 is a top plan, partially phantom view of the fishing lure of FIG. 1.

DETAILED DESCRIPTION OF THE PREFERRED EMBODIMENTS

Figure 3:
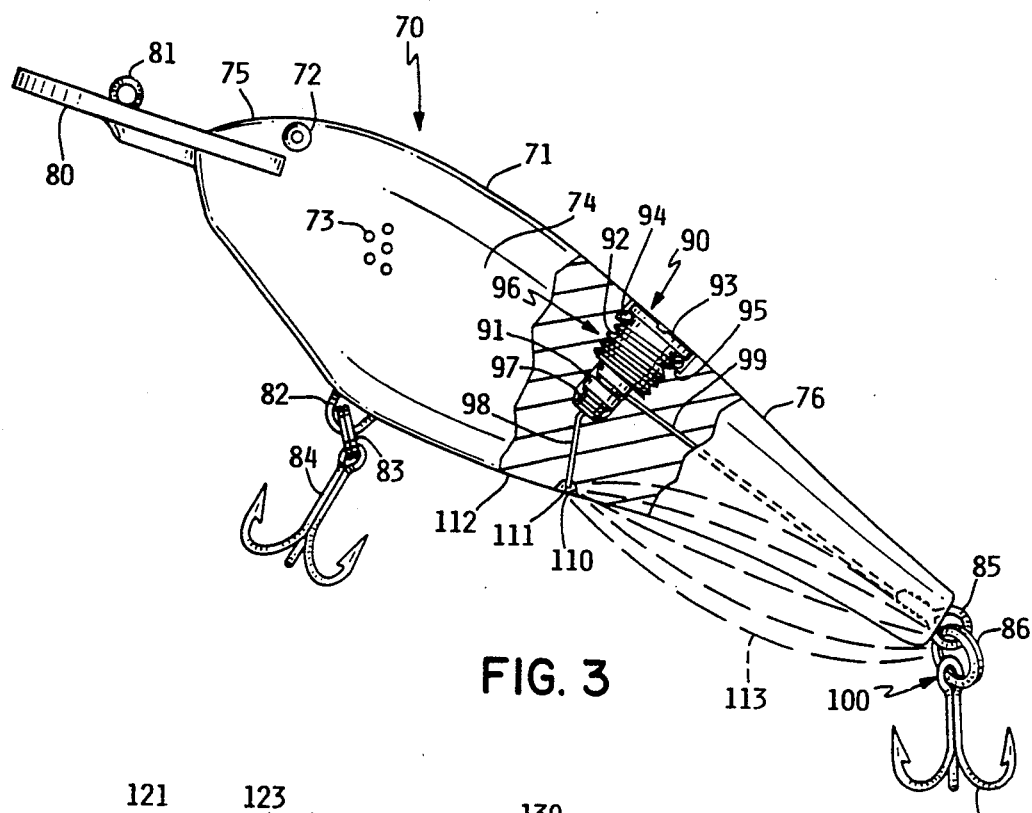
FIG. 3 is a side elevation, partially broken away view of an alternate embodiment of the fishing lure.

As shown in FIGS. 1 and 2, the present electromagnetic field generating fishing lure is indicated by the reference numeral 10. The fishing lure 10 includes a lure body 11, anode and cathode terminals 12, 13 extending from the lure body 11 for creating an electromagnetic field 14 about the lure body 11, and a battery power source 15 for generating electricity for the leads 12, 13. The production of the electromagnetic field 14 attracts fish by mimicking the electromagnetic field naturally produced by live fish. Such an electromagnetic field is produced by the lateral line of a fish; electromagnetic fields of other fish are also sensed by the lateral line. The lateral line is a linear series of sensory pores and tubes extending along each of the sides of a fish from head to tail and is typically found on a fish in the area between phantom lines 16, 17 as shown in FIG. 1. Reference numeral 18 indicates the lateral line in general.

More specifically, as shown in FIGS. 1 and 2, the lure body 11 generally reflects the form of a small fish or minnow. As well as including colors or markings such as colored spots 20 on or outside of the lateral line 18 to closely resemble the colors of a fish, the lure body 11 includes other features of a fish such as a pair of eyes 21, a rear tapering portion 22 and a front tapering portion 23. Furthermore, as shown in FIG. 2, the lure body 11 is relatively thin.

The lure body 11 further includes a front eyelet 30 to which a fishing line 31 is attached, a bottom metal eyelet 32, and a rear metal eyelet 33. Metal barbed treble hooks 34, 35 are connected via respective metal rings 36, 37 to their respective metal eyelets 32, 33. The lure body 11 still further includes a spoon 38 to provide a certain type of action, such as a diving action, to the lure 10. The lure body 11 is typically formed of plastic, but may be formed of other materials such as wood if desired. Preferably the lure body 11 is elongate and of at least finger length.

The battery power source or electric generating means 15 is typically permanently fixed in the lure body 11 such as by being hermetically molded into the body 11. A cathode lead 40 extends in the lure body 11 from the battery power source 15 to the eyelet 33 such that the conductive eyelet 33, hook 35, and ring 37 act as the cathode terminal 13. An anode lead 41 extends in the lure body 11 from the battery power source 15 to the eyelet 32 such that the conductive eyelet 32, hook 34 and ring 36 act as the anode terminal 12. It should be noted that the battery power source 15, and the leads 40, 41, are hermetically sealed within the lure body 11 by, for example, coating the lure body 11 with silicone. The battery power source 15 preferably generates 1.5 volts, but may generate voltage in a range from 0.1 volts to about 3 volts.

In operation, the electromagnetic field 14 is generated by the anode and cathode terminals 12, 13 when the fishing lure 10 is cast into water. The electromagnetic field 14 is generated about the rear portion 22 of the lure body 11 and about each of the lateral lines 18 of the lure body 11 so as to mimic the electromagnetic field naturally generated by a fish and so as to attract other fish. When the lure 10 is out of water, no significant electromagnetic field is generated between the anode and cathode terminals 12, 13. The generation of the electromagnetic field 14 is not dependent upon light, and generates a relatively constant amount of voltage when in water.

In an alternate embodiment of the invention, as shown in FIGS. 1 and 2, the battery power source 15 may be replaced or complemented by a solar cell power source or electric generating means 50. The solar cell power source 50 includes anode and cathode terminals 51, 52. An anode lead 53 extends from the solar cell anode terminal 51 to the hook anode terminal 12. A cathode lead 54 extends from the solar cell cathode terminal 52 to the hook cathode terminal 13. Accordingly, electromagnetic fields are generated between the hook anode and cathode terminals 12, 13, between the hook anode terminal 12 and the solar cell cathode terminal 52, between the hook cathode terminal 13 and the solar cell anode terminal 51, and between the solar cell anode and cathode terminals 51, 52. The solar cell power source 50 is affixed to a top edge 55 of the lure body 11, and the leads 53, 54 extend through and are sealed in the lure body 11. If desired, the solar cell anode terminal 51 may be disposed forwardly of the solar cell cathode terminal 52. Furthermore, the solar cell 50 may be affixed to one or both sides of the lure body 11.

In another alternate embodiment of the invention, the fishing lure 10 includes an integrated circuit chip 60 with a read-only-memory (ROM) 61 for varying the strength and or frequency of the electromagnetic field being generated about the fishing lure 10. The IC chip 60 is sealed within the lure body 11 and includes a pair of incoming leads 62, 63 from one of the power sources 15, 50 and a pair of output leads 64, 65, each of which extends to one of the terminals 12, 13. The IC chip 60 further includes a temperature sensor 66 for sensing the temperature of the lure body 11. If desired, the temperature sensor 66 may be disposed on the outer surface of the lure body 11 to measure the temperature of the water directly. The temperature of the water is one factor which may regulate the amount of voltage relayed by the IC chip 60. Another factor may be the amount of light sensed by the solar cell power source 50.

In another alternate embodiment of the invention, as shown in FIG. 3, a fishing lure 70 includes a lure body 71 generally resembling the shape and appearance of a small fish or minnow. The lure body 11 includes a pair of eyes 72 and spots or markings 73 on a lateral line 74. The lure body 11 is elongate, relatively thin, and includes a front tapering portion or head 75 and a rear tapering portion or tail 76 to reflect the shape of a small fish or minnow. The lure body 11 further includes a front spoon 80 on which an eyelet 81 is mounted for being affixed to a fishing line, a bottom eyelet 82 with an accompanying ring 83 and barbed hook 84, and a rear metal eyelet 85 with an accompanying metal ring 86 and barbed hook 87.

A battery power source or electric generating means 90 of the lure 70 includes a pair of removable batteries 91. The batteries 91 are removably fixed in the lure body 11 via a threaded plug 92 having a slotted head 93 for being engaged by a screwdriver or small coin. An O-ring 94 is pinched between the head 93 and an annular shoulder 95 of the lure body 11 to seal the batteries in the body 11. The shoulder 95 forms a portion of a threaded aperture 96 which engages the plug 92 and batteries 91. The batteries 91 are engaged between the plug 92 and a conductive coil spring 97 which is electrically connected to anode lead 98. A cathode lead 99 is electrically connected to the battery 91 adjacent to the plug 92 and extends therefrom to a cathode terminal 100 which includes the eyelet 85, ring 86, and hook 87.

The lure body 11 includes a dimple or depression or isolation means 110 for isolating an exposed lead portion or anode terminal 111 from contact with objects such as a moist tray of a tackle box which may cause a short between the terminals 100, 111. The length of the exposed portion or terminal 111 is less than the depth of the dimple 110 such that a lower edge 112 of the lure body 11 prevents a flat surface from coming into contact with the terminal 111. Water, however, flows into the dimple 110 to permit the generation of an electromagnetic field 113 between the terminals 100, 111 about the body 71 of the lure 70. It should be noted that the dimple 110 and an accompanying terminal may be disposed at other locations on the lure body 11. For example, the eyes 21 or colored spots or markings 20, 73 may act as dimples 110 and terminals. It should also be noted that the isolation means 110 may include an annular lip or other type of protrusion from the lure body 11 and be disposed about a respective terminal.

Figure 4:
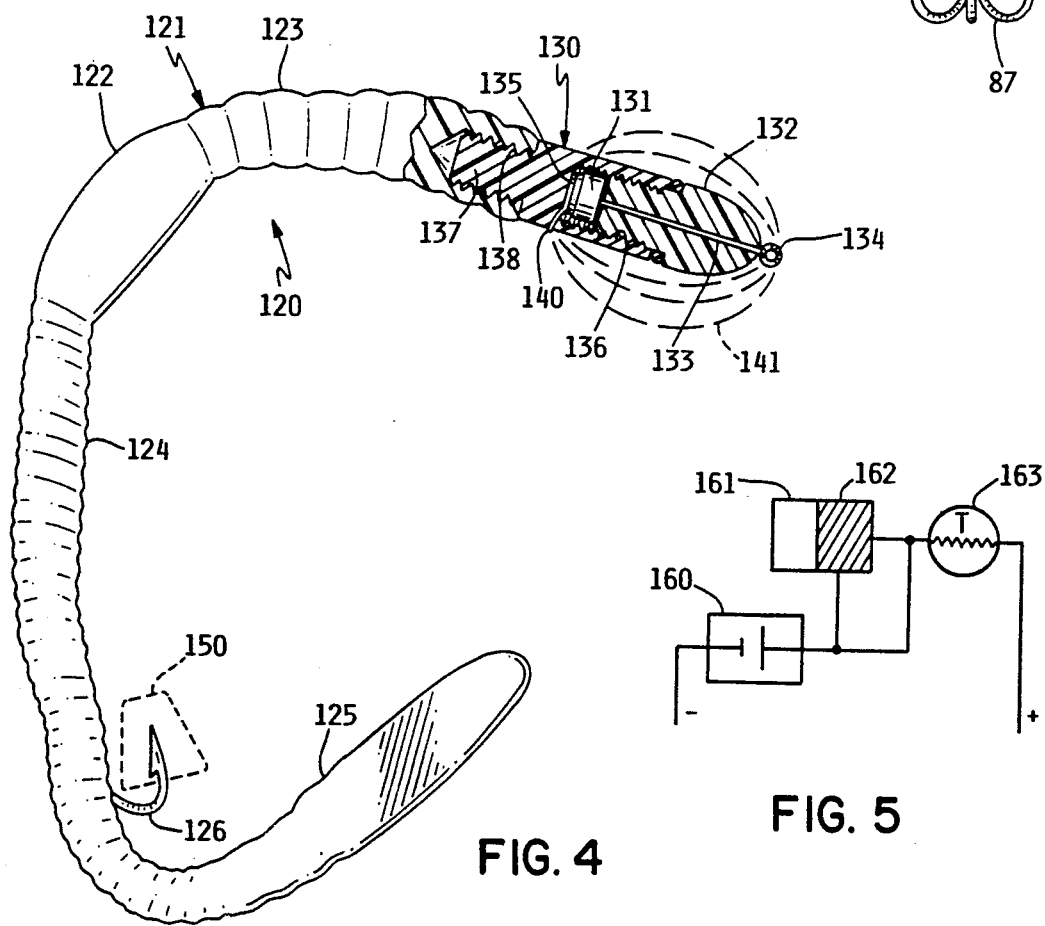
FIG. 4 is a side, partially broken away view of another alternate embodiment of the fishing lure.

In another alternate embodiment of the invention, as shown in FIG. 4. a fishing lure 120 includes an elongate, replaceable, flexible portion 121 and generally reflects the shape and appearance of a worm. The elongate flexible portion or body 121 includes a collar 122, annular ribbed or fluted sections 123, 124 on either side of the collar 122, and a flattened tail section 125. A barbed hook 126 extends from the annular ribbed section 124. The elongate portion 121 may be plastic or rubber.

A semirigid head portion 130 of the worm 120 houses an electric generating means or replaceable battery power source 131. The head portion 130 includes a threaded plug 132 through which a cathode lead 133 extends to form a cathode terminal or eyelet 124. A fishing line is tied to the eyelet 124. The battery power source 131 is engaged between the cathode lead 133 and plug 132 and an anode lead 135 affixed in a threaded aperture 136 which engages the plug 132. The head portion 130 further includes an integral threaded pin connector 137 for engaging a threaded axial receptacle 138 of the annular ribbed section 123 such that the flexible portion 121 is replaceable. It should be noted that instead of being threaded, the pin connector 137 may be barbed to be pushed into the worm body 121.

The anode lead 135 includes an exposed lead portion or anode terminal 140. The terminals 134, 140 create an electromagnetic field 141 for attracting fish. It should be noted that lead 135 may extend through the worm body 121 to be electrically connected to the hook 126 if desired to create an electromagnetic field between the hook 126 and eyelet terminal 134. However, the worm body 121 typically may not include such a lead as the body 121 is susceptible to damage and loss such as from fish bites, snags, and the sun.

If hook 126 indeed acts as such a lead, it should be noted that the fishing lure 120 may include an isolation means or non-conductive frustum shaped cork piece or cap 150 on the hook 126 to prevent shorts between the terminals 126, 134 when the lure 120 is out of the water.

It should further be noted that the anode and cathode terminals may be disposed at alternate locations about the lure body. For example, with respect to the embodiment shown in FIGS. 1 and 2, leads 150, 151 may extend from one of the power sources to the eyes 21 such that one eye 21 acts as the anode terminal and the other eye 21 on the other side of the lure body acts as the cathode terminal. The eyes 21 may form dimples, such as dimples 110, with the pupils or iris of each eye being the isolated anode or cathode. Note that pupils 153 of eyes 21 are depressed. With the terminals being disposed on either side of the lure 10, the electromagnetic field is created over both the top and underside of the lure body 11 and over each of the lateral lines 18. Alternatively, each of the eyes 21 may be a cathode terminal to create electromagnetic fields with the anode terminal 12 on each of the sides of the lure 10. Still further, the front eyelet 30 may act as one of the terminals with a lead 154 extending from the eyelet 30 to one of the power sources.

It should be noted that the fishing lure 10 having the hermetically sealed battery 15 may generate an electromagnetic field for at least three years with regular use. It should further be noted that the lure 10 may be used in fresh or salt water. It should further be noted that the positions of the anodes and cathodes described above may be reversed; for example, the batteries may be inserted either way.

Figure 5:
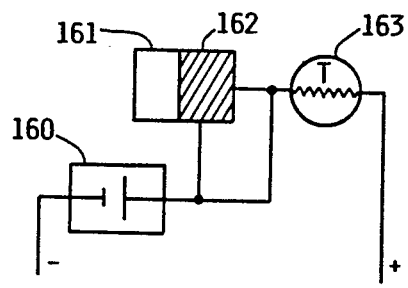

As shown by the schematic of FIG. 5, one circuit for the lures 10, 70, 120 may include a battery or solar cell 160, a storage component 161 such as a ROM, a digital to analog signal converter 162, and a voltage regulating device 163 such as thermistor or temperature sensing resistor. It should be noted that the storage component 161 may cooperate with the thermistor 163 to regulate the desired voltage output. The storage component 161 may also include other information for regulating the voltage output. For example, the information in the storage component 161 may be customized to set a certain voltage to attract a desired kind of fish, to set different voltages for larger or smaller lures, fresh or salt water lures, or minnow-shaped or worm-shaped lures.

The present invention may be embodied in other specific forms without departing from the spirit or essential attributes thereof, and it is therefore desired that the present embodiment be considered in all respects as illustrative and not restrictive, reference being made to the appended claims rather than to the foregoing description to indicate the scope of the invention.

What is claimed is:

1. An electromagnetic field generating fishing lure comprising:
   a) a lure body having means for attachment to a fishing line and at least one hook for catching a fish;
   b) anode and cathode terminals on the lure body to be exposed to water to generate an electromagnetic field adjacent to the lure body when in water; and
   c) a battery sealed in the lure body for supplying electricity continuously at a voltage above 0.1 volts to the anode and cathode terminals to generate the electromagnetic field for attracting fish in light or dark waters.

2. The fishing lure of claim 1, wherein the battery is removably sealable in the lure body.

3. The fishing lure of claim 1, wherein the battery is permanently fixed and sealed in the lure body.

4. The fishing lure of claim 1, wherein the electromagnetic filed generated has a voltage above 1.5 volts.

5. The fishing lure of claim 1, wherein the terminals are offset from each other.

6. The fishing lure of claim 1, wherein one of the terminals is disposed forwardly of the other terminal.

7. The fishing lure of claim 1, wherein the lure body includes opposite sides, each of the terminals being disposed on one of the sides.

8. The fishing lure of claim 1, wherein the lure body includes an elongate flexible portion.

9. The fishing lure of claim 8, wherein the elongate flexible portion generally forms the shape of a worm.

10. The fishing lure of claim 1, wherein the lure body is at least semirigid.

11. The fishing lure of claim 10, wherein the lure body generally forms the shape of a minnow.

12. The fishing lure of claim 11, wherein each of the terminals form at least a portion of one of the eyes of the minnow.

13. The fishing lure of claim 1, wherein the means for attachment comprises an eyelet, the eyelet serving as one of the terminals.

14. The fishing lure of claim 1, wherein the terminals are spaced apart on the exterior surface of the lure body by a distance approximately equal to or greater than one-third the length of the lure body such that the electromagnetic field is generated about a substantial portion of the lure body.

15. An electromagnetic field generating fishing lure comprising:
 a) a lure body having means for attachment to a fishing line and at least one hook for catching a fish;
 b) anode and cathode terminals on the lure body to be exposed to water to generate an electromagnetic field adjacent to the lure body when in water;
 c) electric generating means fixable to the lure body for supplying electricity to the anode and cathode terminals for generating the electromagnetic field for attracting fish; and
 d) variable means between the electric generating means and at least one of the terminals for influencing the electromagnetic field, the variable means comprising a circuit for changing the frequency characteristics of the electromagnetic field.

16. An electromagnetic field generating fishing lure comprising:
 a) a lure body having means for attachment to a fishing line and at least one hook for catching a fish;
 b) anode and cathode terminals on the lure body to be exposed to water to generate an electromagnetic field adjacent to the lure body when in water;
 c) electric generating means fixable to the lure body for supplying electricity to the anode and cathode terminals for generating the electromagnetic field for attracting fish; and
 d) variable means between the electric generating means and at least one of the terminals for influencing the electromagnetic field the variable means comprising a temperature sensor to influence the electromagnetic field in response to temperature.

17. An electromagnetic field generating fishing lure comprising:
 a) a lure body having means for attachment to a fishing line and at least one hook for catching a fish;
 b) anode and cathode terminals on the lure body to be exposed to water to generate an electromagnetic field adjacent to the lure body when in water;
 c) electric generating means fixable to the lure body for supplying electricity to the anode and cathode terminals for generating the electromagnetic field for attracting fish; and
 d) isolation means adjacent one of the terminals for isolating such terminal from contact with objects whereby shorts between the anode and cathode terminals are minimized when the fishing lure is out of the water.

18. The fishing lure of claim 17, wherein the isolation means comprises a dimple formed in the lure body about the terminal being isolated, the terminal being isolated having an exposed portion, the depth of the dimple being greater than the length of the exposed portion to protect the exposed portion against contact with solid objects.

19. The fishing lure of claim 18, wherein the electric generating means comprises a battery.

20. An electromagnetic field generating fishing lure comprising:
 a) a lure body having means for attachment to a fishing line and two spaced apart hooks for catching fish;
 b) anode and cathode terminals on the lure body to be exposed to water to generate an electromagnetic field adjacent to the lure body when in water;
 c) electric generating means fixable to the lure body for supplying electricity to the anode and cathode terminals for generating the electromagnetic field for attracting fish; and
 d) the terminals being electrically connected to the hooks such that each of the hooks serves as one of the terminals.

21. An electromagnetic field generating fishing lure comprising:
 a) a lure body having means for attachment to a fishing line and at least one hook for catching a fish, the lure body having generally the shape of a minnow, the lure body having an exterior surface;
 b) anode and cathode terminals on the lure body to be exposed to water to generate an electromagnetic field adjacent to the lure body when in water;
 c) a battery in the lure body for supplying electricity to the anode and cathode terminals to generate the electromagnetic field for attracting fish in light or dark waters;
 d) the terminals being spaced apart on the exterior surface of the lure body such that the electromagnetic field is generated about the lure body; and
 e) isolation means adjacent one of the terminals for isolating such terminal from contact with objects whereby shorts between the anode and cathode terminals are minimized when the fishing lure is out of the water.

22. An electromagnetic field generating fishing lure comprising:
 a) a lure body having means for attachment to a fishing line and at least one hook for catching a fish;
 b) anode and cathode terminals on the lure body to be exposed to water to generate an electromagnetic field adjacent to the lure body when in water; and
 c) a battery sealed in the lure body for supplying electricity at a voltage above 0.1 volts to the anode and cathode terminals to generate the electromagnetic field for attracting fish in light or dark waters.

* * * * *